(12) United States Patent
Schmidt et al.

(10) Patent No.: US 7,880,120 B2
(45) Date of Patent: Feb. 1, 2011

(54) TRANSPARENT WINDOW PANE PROVIDED WITH A RESISTIVE HEATING COATING

(75) Inventors: Lothar Schmidt, Aachen (DE); Carole Baubet, Aachen (DE); Marc Maurer, Compiegne (FR)

(73) Assignee: Saint-Gobain Glass France, Courbevoie (FR)

( * ) Notice: Subject to any disclaimer, the term of this patent is extended or adjusted under 35 U.S.C. 154(b) by 683 days.

(21) Appl. No.: 11/665,489

(22) PCT Filed: Oct. 12, 2005

(86) PCT No.: PCT/FR2005/050843

§ 371 (c)(1),
(2), (4) Date: Jul. 13, 2007

(87) PCT Pub. No.: WO2006/040498

PCT Pub. Date: Apr. 20, 2006

(65) Prior Publication Data

US 2009/0044464 A1     Feb. 19, 2009

(30) Foreign Application Priority Data

Oct. 15, 2004  (DE) ................ 10 2004 050 158

(51) Int. Cl.
*B60L 1/02* (2006.01)
(52) U.S. Cl. ............... 219/203; 219/522; 219/541; 219/543; 52/171.2
(58) Field of Classification Search ............... 219/203, 219/522, 541, 543; 52/171.2; 338/306–309
See application file for complete search history.

(56) References Cited

U.S. PATENT DOCUMENTS 5,434,384 A * 7/1995 Koontz ................... 219/203
5,496,989 A * 3/1996 Bradford et al. ........... 219/497

FOREIGN PATENT DOCUMENTS

| | | |
|---|---|---|
| DE | 1 256 812 | 12/1967 |
| DE | 29 36 398 A1 | 3/1981 |
| DE | 3644297 | 7/1987 |
| DE | 197 02 448 | 7/1998 |
| DE | 198 32 228 | 2/2000 |
| DE | 198 291 51 | 2/2000 |
| WO | 00/72635 | 11/2000 |
| WO | 03/024155 | 3/2003 |
| WO | 03/075351 | 9/2003 |
| WO | 2004/032569 | 4/2004 |

OTHER PUBLICATIONS

U.S. Appl. No. 12/528,128, filed Aug. 21, 2009, Blanchard, et al.

* cited by examiner

*Primary Examiner*—Tu B Hoang
*Assistant Examiner*—Vinod D Patel
(74) *Attorney, Agent, or Firm*—Oblon, Spivak, McClelland, Maier & Neustadt, L.L.P.

(57) ABSTRACT

The inventive transparent window pane is provided with a resistive heating coating (2) which extends through a substantial portion of the window pane, in particular on a main view field (A) and is electrically connected to at least two conductor rails (4, 5) in such a way that, when an electric' supply voltage is applied between said conductor rails, a circulating current heats the coating heating field, wherein said heating field comprises at least one semi-resistive area (6) directly contacting at least on e conductor rail (4, 5).

28 Claims, 4 Drawing Sheets

TRANSPARENT WINDOW PANE PROVIDED WITH A RESISTIVE HEATING COATING

BACKGROUND

The invention relates to a transparent glazing unit with a resistive heating coating.

The invention relates more particularly to a glazing unit whose resistive heating coating is a coating placed on a substrate and having thermal insulation and/or solar protection capabilities. The glazing units incorporating this type of coating, when they are intended for equipping vehicles, make it possible in particular to reduce the air-conditioning load and/or reduce excessive overheating ("solar control" glazing) and/or reduce the amount of energy dissipated to the outside ("low-e" or "low-emissivity" glazing) brought about by the ever growing use of glazed surfaces in vehicle passenger compartments.

One type of multilayer known for giving substrates such properties consists of at least two metal layers, such as a silver-based layer, each being placed between two coatings made of a dielectric. This multilayer is generally obtained by a succession of deposition operations carried out using a vacuum technique, such as cathode sputtering, optionally magnetically enhanced or magnetron cathode sputtering. Two very thin metal layers, called "barrier layers" may also be provided, these being placed beneath, on, or to each side of each silver layer, the underlayer as a tie, nucleation and/or protection layer, for protection during an optional heat treatment subsequent to deposition, and the overlayer as a protective or "sacrificial" layer so as to prevent impairment of the silver if the oxide layer that surmounts it is deposited by sputtering in the presence of oxygen and/or if the multilayer undergoes a heat treatment subsequent to deposition.

In particular for vehicle windshields, there is high demand in the market for heating versions, in which the heating means must by nature be the least visible, or least obstructing for viewing, as possible. Consequently, there is an increasing demand for a transparent heating coating for such glazing.

A general problem with heating coatings having a low light absorption is their relatively high surface resistance, which requires a high supply voltage, in any case for heated glazing of large dimensions or for long current paths, which voltage is in any case higher than the usual voltages on board vehicles. If it is desired to lower the surface resistance, this is accompanied, in the multilayer systems known hitherto, with a reduction in visible light transmission because the conducting layers have to be thicker.

For these technical reasons, glazing units heated by wires, which may be supplied without any problem by the on board voltage, are still preferably being mounted at the present time. These laminated glazing units with integrated heating fields in the form of very fine wires are, however, not accepted by all purchasers.

Patent DE 1 256 812 B1 discloses a glass pane that can be heated by a coating made of metal or a metal oxide deposited continuously on one of its surfaces. This publication aims to solve problems due to the high ohmic resistance of said coating, which is of the order of 200 Ω/□. However, to be able to heat this coating using a relatively low voltage from two lateral busbars, narrow printed electrodes of low ohmic resistance (called "auxiliary electrodes") that extend from said busbars over the heating field are provided. Said auxiliary electrodes terminate only a short distance in front of the opposite busbar, and they overlap each other with an alternating polarity.

However, said lines, which are optically perceivable as a hatching, obstruct vision and detract from the optical appearance of the main viewing field of the pane thus produced. It is not possible to make use of the optical advantage of a transparent heating coating. It is for this reason that such a pane is designed only for a rear window of automobiles.

Another problem with heating coatings may arise owing to the fact that they are sometimes not able to be deposited uniformly over the entire surface of the transparent glazing, but one or more interruptions, called "communication windows", have to be provided therein, which disturb the flow of the heating current and may form "hot spots" (local overheating) along the edges of this or these communication windows. Such communication windows serve to make the coating, which by nature is reflective for short-wave radiation, respectively infrared radiation, locally more permeable to certain data streams or signals.

To inject and extract the heating current in these coatings, at least one pair of electrodes (in the form of bands) or of busbars, which have to inject the current into the heating coating and distribute it over a wide front as uniformly as possible, is provided. In vehicle glazing, which is substantially more wide than high, the busbars are usually found along the longer edges of the glazing (in the mounted position, the upper and lower edges), so that the heating current can travel along the shortest path over the height of the glazing. At the same time, the aforementioned communication windows are most of the time located at the upper edge of the glazing and extend there over several centimeters of width.

Document WO 00/72635 A1 discloses a transparent substrate with a coating that reflects IR rays and a communication window produced locally by removal or omission of the coating.

Obviously, each communication window which modifies the uniformity of the coating disturbs the current flow. Local temperature spots ("hot spots") appear, which may result in damage to the substrate (thermal stresses) and to the coating itself. This is not only the case when the coating is defective over a large area, but also when the communication window is formed by a relatively large number of slots that do not communicate with one another. These also result, in the surface part in question, in an appreciable increase in the layer resistance and also give rise to the abovementioned hot spots.

The last document mentioned proposes, as a means of reducing the problematic effect of an extensive communication window, to provide, along its edge, an electrically conducting band that has an ohmic resistance per square which is significantly lower than that of the heating layer. Said band purports to take the current around the cut. Preferably, a communication window is framed entirely by such a band. The band may be produced by printing a silver-containing conductive screen-printing paste and by baking it. However, it may also be applied by the deposition of an electrically conducting lacquer or by depositing a metal strip. In all cases, a conducting electrical connection of the band to the coating is of course necessary in order for it to operate.

The band may be concealed from view by superposing an electrically nonconducting opaque masking strip, for example made of black enamel. As a general rule, such masking strips are made up from black-colored nonconducting material (screen-printing paste) to be baked. Infrared radiation is not reflected by this material, but absorbed.

Document WO 03/024155 A2 discloses transparent glazing of this type with a heating coating, in which, on the one hand, a maximum nominal voltage of 42 V is indicated, which however aims also to solve the problem of "hot spots" along the edges of a communication window. In general, various voltage levels are used, a lower voltage being applied to shortened current paths (for example because of the communication window) so as to avoid local overheating. Specifically, the communication window region is cut out from the heating surface by placing a separate busbar between the communication window and the busbar located on the opposite side.

Also known, from document DE 36 44 297 A1, are many examples of heating coatings for a vehicle windshield that are divided. The divisions may thus be produced by parts that are not provided with surface layers and/or by notches produced mechanically or by a laser beam. They are used for suitably adjusting and deflecting a current flow within the coated surface and have to ensure as uniform as possible a current density in the surfaces in question.

Document WO 2004/032569 A2 discloses another configuration of transparent glazing with a heating coating, which also aims to achieve uniformity of the heating power in the surface by separating lines traced in the coating.

Document DE 29 36 398 A1 relates to measures intended for preventing current spikes in the transition between the busbars and the coating, in transparent glazing with a heating coating. In general, the aim is to reduce the sudden difference in resistance between the coating and the busbars using materials or shapes with a higher resistance for the latter, or else with intermediate resistances. The above document indicates surface resistances of the coating of between 1 and 10 ohms per unit area. In one of the many embodiments described in that document, the edge of each busbar turned toward the opposite busbar is of corrugated form. The formation of sharp points turned toward the heating coating must thus be avoided. This approach aims to appreciably lengthen the transition line between the busbar and the coating and consequently to reduce the current density in this transition. However, all these measures seem poorly suited to be able to supply the heating layer with a relatively low voltage.

It is also known to provide, on the incident face of photovoltaic solar cells, grid or comb electrodes (see for example document WO 03/075351 A1). They are often produced by screen printing and made up of a busbar placed along the edge of the solar cell and of a plurality of small comb teeth that extend from the busbar over the surface of the solar cell. These electrodes allow surface connection for the photovoltaic voltage, which is present on both faces of the absorber, between the front comb electrode and the rear metal electrode, respectively, over its entire surface without excessively reducing the penetration of light into the absorber.

Document DE 197 02 448 A1 discloses a heated mirror, on the glass substrate of which two comb-shaped conducting tracks or electrodes are placed, these being indented one in the other, with a PTC coating (i.e. one having a positive temperature coefficient of resistance) that covers them and fills the intermediate spaces between the comb teeth. However, that document does not consider the problem of making the heating invisible to the eye, because the conducting tracks and the heating layer may be placed behind the mirror layer.

Document DE 198 32 228 A1 discloses vehicle glazing with an electrically conducting coating that is optically transparent and used as an antenna. Purely capacitive high-frequency radio signals are picked up from the antenna layer using a coupling electrode, which is made up of several fine wires connected together and placed parallel to one another at a certain distance apart that is large compared with their diameter, which wires extend from the edge into the viewing field of the glazing and terminate therein, without continuing. There is no galvanic coupling between the coating and these wires, because each time they lie in different planes from the laminated glazing.

The busbars already mentioned many times may be produced on the glass pane equally well by printing (screen printing) before or after deposition of the coating, or by soldering thin strips of sheet metal, preferably made of tinned copper. Combinations of printed busbars and metal-strip busbars are also known (see for example document DE 198 29 151 C1). Admittedly, the busbars are usually narrow and in the form of strips, but they are not transparent. For optical reasons, they are therefore placed each time near the outer edge of the transparent glazing units in question. Most of the time, they may be masked by opaque edge coatings (usually produced by screen printing). Likewise, the aforementioned communication windows may be masked by these edge coatings, provided that they are sufficiently permeable to the radiation to be transmitted via the communication window.

In standard vehicle windshields, these opaque coatings are in the form of a frame provided all around the glazing, which frame also has the function of protecting the bonded joint between the glazing and the body from UV radiation. These frames surround the general viewing field of the glazing. In windshields, a distinction may also be made between the main viewing field A, approximately in the middle of the area of the glazing, in which there can be no perceptible impairment of vision (for example by colorations or wires or other damage larger in size than 30 microns), and the secondary viewing field B closer to the edges.

The problem at the basis of the invention therefore consists in how to provide a transparent glazing unit provided with a heating coating that can operate with relatively low nominal voltages, in particular around 12 to 14 volts, and which nevertheless produces a uniform distribution of the heating, in particular without any hot spot, with viewing in the general viewing field of the glazing, and in particular in the main viewing field A of the glazing, which is impeded as little as possible.

BRIEF SUMMARY

According to the invention, the heating field, formed by the current flowing between the busbars when an electrical supply voltage is applied between these busbars, includes at least one semiresistive region in direct contact with at least one busbar.

The term "conducting" should be understood within the context of the present invention to mean that the element thus termed admittedly has an electrical resistance, as it is out of the question here to use superconductors, but that this resistance is very low, in such a way that when the electric current used flows through this element, it does not heat up so as to be perceptible by touching it with one's hand within one minute of applying voltage, that is to say that this element will be classed as constituting a cold region when the glazing unit is observed by thermography.

The term "resistive" should be understood within the context of the present invention to mean that the element thus termed has a high overall electrical resistance, in such a way that, when the electric current used passes through this element, it heats up so as to be perceptible by touching it with one's hand within one minute after applying voltage, that is to say that this element will be classed as constituting a hot region when the glazing unit is observed by thermography. Within the technical field in question, the resistive regions have a surface resistance of around 0.5 to 5 ohms per unit area and the hot regions formed at their places have power densities of at least 400 to 450 watts/m².

The term "semiresistive" should be understood within the context of the present invention to mean that the element thus termed has a low overall electrical resistance, which is less than that of the resistive element(s), but greater than that of the conducting element (s). The expression "semiresistive region" used in particular here denotes an area having a low overall resistance. However, the region may have a high resistance in certain places and a very low resistance in other places. For example, it may even include conducting elements and resistive elements, the combination and configuration thereof make said region "semiresistive".

The heating field is the direct result of the electric field when voltage is applied to the terminals of the electric field. It also denotes the actual heating region of said glazing, which extends between the two busbars.

The object of the present invention is to create a novel heating field through the use of a particular electric field. As in the electric fields of the prior art, the ends of the electric field are formed by conducting regions embodied by the busbars, and between these busbars an electric field is produced. However, unlike the prior art, the surface resistance of this field is not uniform over its entire area—a semiconducting region is produced in contact with at least one busbar. This has the effect of promoting electrical conduction in this region through which the current flows and has the effect as it were of favoring energy transport into the following resistive region.

At least one part of the electric field according to the invention thus has the following scheme, from one busbar to the other:

conducting region/semiconducting region/resistive region/ . . . /conducting region.

Thus over at least one path between two busbars, the current will firstly pass through a semiconducting region and then through a resistive region.

The electric field between the busbars thus has a resistivity gradient formed from at least two separate (semiresistive/resistive) states. There may also be a gradual gradient formed from many states, thus passing gradually from the conducting state to the resistive state and then returning to the conducting state.

This may all be observed by thermography.

The present invention is of most particular importance in the "panoramic windshield" technology.

In this technology, the aim is to produce windshields that are as wide and/or as tall as possible, which include portions extending laterally along the sides of the vehicle and/or on the roof of the vehicle.

Thanks to the invention, it is thus possible to produce heating panoramic windshields in which the heating power is concentrated in the essential part of the glazing, namely the main viewing field A.

With these features and arrangements, a relative shortening of the path of the current flow within the coating of relatively high resistance itself is obtained because part of the distance between the actual busbars and the main central heating field, in the main viewing field A, is crossed by low-resistance auxiliary conductors or else by said semiresistive regions.

The main viewing field A of the glazing preferably has no semiresistive region and thus it remains optically free of any perturbations or obstructions.

In an alternative embodiment, at least one semiresistive region is preferably in direct contact with at least one busbar at the positive potential.

At least one other semiresistive region is then preferably in direct contact with at least one busbar at the negative potential and the main viewing field A then preferably lies between said two at least semiresistive regions.

In one particular version of the invention, the semiresistive region includes conducting strands formed from conducting printed lines, preferably printed on the heating coating 2 and/or from conducting wires, these conducting wires preferably being electrically connected to the heating coating and at least to said semiresistive region by soldering at least at discrete contact points.

The conducting strands cover only part of the heating field (close to the edges of the glazing), especially a relatively wide strip along the busbars.

They terminate blindly, preferably before the boundary of the central viewing field A.

Thus, a semiresistive region that does not greatly impair viewing, which in any case is the aim with any semiresistive region referred to here, is used.

Unlike in document DE 1 256 812 B1, there are no overlapping elements of opposite polarity in the region of the main viewing field and the current flows, after activating the electrical power supply, approximately in a direction normal to the busbars and therefore in a direction parallel to the overall longitudinal direction of the blindly terminating conducting strands. It should be understood that this "overall longitudinal direction" is the general direction or extension along which said strands extend from the busbars toward the main viewing field.

Furthermore, the resistance of the transition between the busbar and the coating is further reduced by greatly increasing the areas of contact compared with the prior art. Consequently, the voltage needed to make the heating currents flow over the heating surface is lower.

Admittedly, this configuration is preferably used for windshields in which good visibility in the central viewing field suffices for safe driving, however heated glazing units according to the invention may also be fitted at other places on the vehicle, and also in other machines and moving equipment and in buildings.

Whereas in conventional solar cells with gate or comb electrodes the voltage is applied over the thickness of the layer of the absorber, a voltage is applied in the application according to the invention for the purpose of making a current flow in the plane of the coating. The conducting strands and the semiresistive regions according to the invention thus have the effect of bringing the busbars, customarily placed along the edge of the glazing, electrically closer together without however appreciably degrading the general viewing field of the glazing and without degrading at all the main viewing field A.

Moreover, it should be recognized that in document WO 00/72635 cited above, the electric field, and consequently the heating field, does not include a semiresistive region since the strip that surrounds the communication window is excluded from the electric field owing to the fact that a resistive region is interposed between the closest busbar and the communication window that it surrounds. The trace of the electric field lines in the last figure of the above document shows that the lines go around the communication window while still remaining in the resistive coating, without passing through the strip that surrounds the communication window.

When used in a vehicle, the configuration according to the invention makes it possible in particular for the windshield to be supplied directly, in order to heat it, with the usual onboard voltage of 12 to 14 V DC, for which voltage a coating having as low as possible an ohmic resistance is of course recommended. The extent of the semiresistive regions or else the length of the strands is dimensioned according to the effective surface resistance of the coating chosen—the more conducting the coating itself, the narrower the semiresistive regions may be or the shorter the strands may be.

Measured from the busbars, the extent of the semiresistive regions or the length of the strands is greater than the width of the respective busbar to which they are attached and the strands that extend into the heating field in contact with the heating coating.

Likewise, with this configuration it is possible to keep the entire coating on the surface of the transparent glazing—apart from the optionally provided communication windows—in such a way that neither masking nor removal of coating is necessary. Thus, the positive properties of the coating, namely in particular its infrared reflection (thermal insulation) and its uniform color (in reflection and in transmission), are preserved over the entire surface.

The conducting strands have a width and/or a thickness of preferably 0.5 mm or less, and even more preferably 0.3 mm or less, measured in projection on the surface of the glazing unit.

The additional conducting strands, which are also as thin as possible, only imperceptibly impede vision through the glazing.

Given that the transparent glazing is in almost all cases a laminated glazing unit in which the coating itself is placed on a face lying on the inside of the composite glazing, the conducting strands could also, apart from printing, be produced in the form of thin wires that are fixed, for example in a manner known per se, to a composite adhesive film and then deposited, with this film, on the coating, thus coming into electrical contact with the coating. This contact is stable over a long period after the final bonding of the laminated glazing.

In the embodiment in the form of screen-printed structures, the conducting strands are preferably deposited on a substrate (made of glass or plastic or a plastic film) before the coating is applied. This may be carried out in a single operation together with the deposition of the actual busbars.

It is also possible to straddle, with a region of low resistance or with conducting strands, one or more communication windows produced along the edge of the glazing in the coating, without any risk of forming hot spots. The currents in the known problem areas along the lateral edges of such communication windows are very greatly reduced by the strands.

BRIEF DESCRIPTION OF THE DRAWINGS

Other details and advantages of the subject of the invention will become apparent from the drawings of an exemplary embodiment in the form of a vehicle windshield and from their detailed description that follows.

In these schematic drawings, drawn to no particular scale.

DETAILED DESCRIPTION

Figure 1:
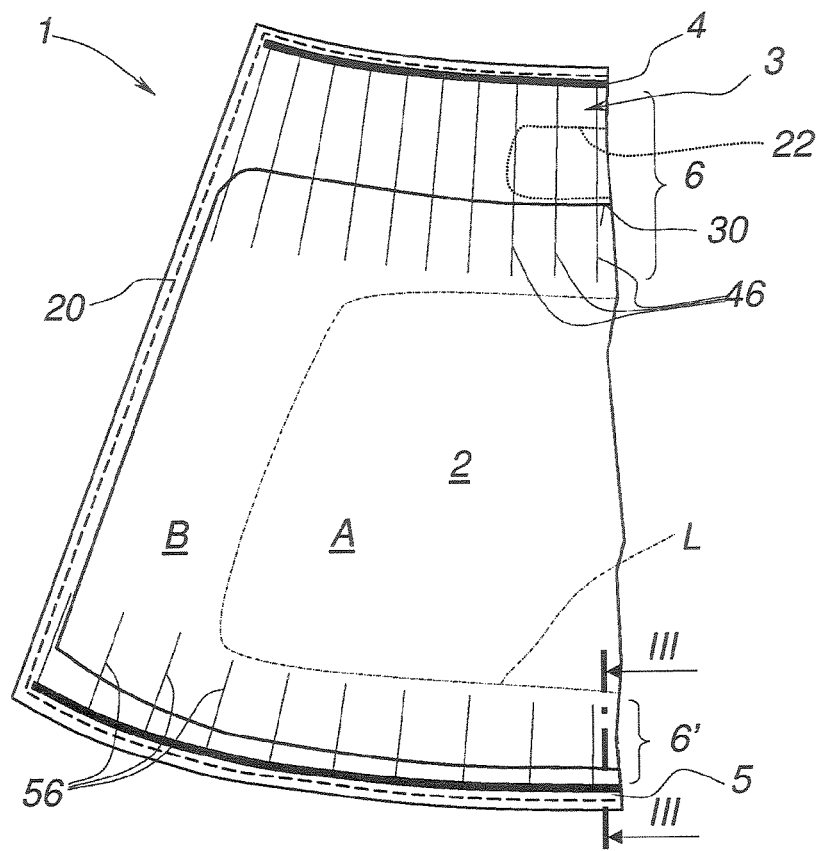
FIG. 1 illustrates an embodiment of a transparent glazing unit with a resistive heating coating, in which embodiment busbars in the form of strips are connected to grid strands that extend in the form of very fine fingers in the surface of the glazing.

In the figures, an electrically resistive transparent coating 2 is placed over the entire surface in a manner known per se in a heated laminated glazing unit 1 having an essentially trapezoidal (curvilinear) outline. The glazing unit 1 has been shown here only in one half—its other half is equivalent.

The coating 2 is deposited in a known manner on a main face of a substrate 11, this substrate then being integrated into the glazing unit 1.

A broken line denoted by 20 indicates that the outer edge of the continuously coated surface lies all around, but slightly set back toward the inside of, the peripheral outer edge of the laminated glazing unit 1, that is to say an edge band is provided in the coating all around the surface. Thus, the coating is, on the one hand, electrically isolated from the outside and, on the other hand, protected against any corrosion damage penetrating via the outer edge of the glazing. The outer edge 20 may be set back by removing the coating along the edge of the glazing, by masking the outline of the substrate before the coating is deposited on this substrate, or else by tracing a separating line that passes through the coating and runs along the outer edge of the substrate, which may be sufficient for meeting the isolation and corrosion protection objectives.

The coating 2 itself is preferably made up, in a manner known per se, from a multilayer solar-protection system of high thermal resistance comprising at least one metal functional layer and preferably at least two metal functional layers, this system withstanding, without any damage, the temperatures above 650° C. that are required for bending the glass panes, that is to say without its optical, electrical and heat-reflecting properties being degraded. The multilayer system also includes, apart from the metal layers (which are preferably based on silver), other layers such as antireflection layers and, optionally, barrier layers.

However, in relation to the present invention, it is also possible to use other electrically conducting multilayer systems that have a low temperature resistance, and in particular also multilayer systems that are not deposited directly on a rigid glass pane but on a plastic film, (preferably a PET film). All these multilayer systems are preferably deposited by sputtering (magnetron cathode sputtering).

The surface resistivity of the current multilayer systems of the type mentioned above lies between about 0.5 and 5 $\Omega/\square$. Vehicle windshields with such multilayer systems must achieve overall a light transmission of at least 75% according to some standards, or 70% according to other standards.

Of course, the composition and the production of the coating are of secondary importance here, so that there is no need to dwell on details thereof.

An opaque colored layer 3 in the form of a peripheral frame has been deposited along the edge of the laminated glazing unit 1, the inner edge 30 of which layer, relative to the outer edge of the glazing unit, circumscribes the general viewing field of the transparent glazing unit 1. This layer may lie in a plane of the laminated glazing unit other than that of the coating 2 (being located on the inside or on the outside of the composite glazing unit). It serves as a layer for protecting a bead of adhesive, with which the finished glazing unit is bonded to a vehicle body, from UV radiation. Moreover, it can conceal from view connection elements for the main electrical heating function and for the optional additional electrical functions of the glazing unit 1.

Thus, the figure shows, along the upper edge of the laminated glazing unit 1, in the region of the surface covered by the colored layer 3, a first busbar 4 and, along the lower edge, a second busbar 5. The two busbars 4 and 5 are in direct conducting electrical connection with the coating 2, in a manner known per se.

Figure 2:
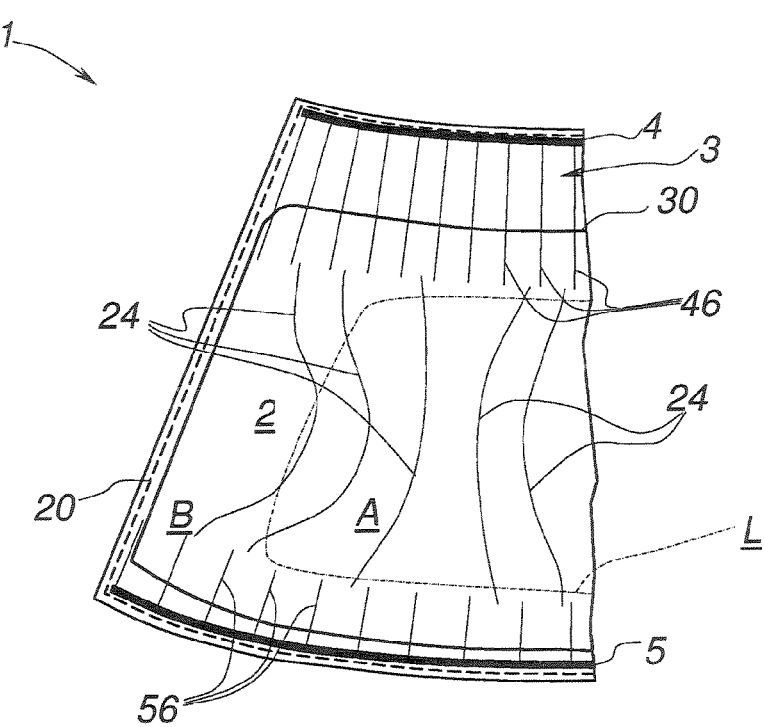
FIG. 2 shows a second embodiment, in which the heating coating is divided into current paths using separating lines.
Figure 5:
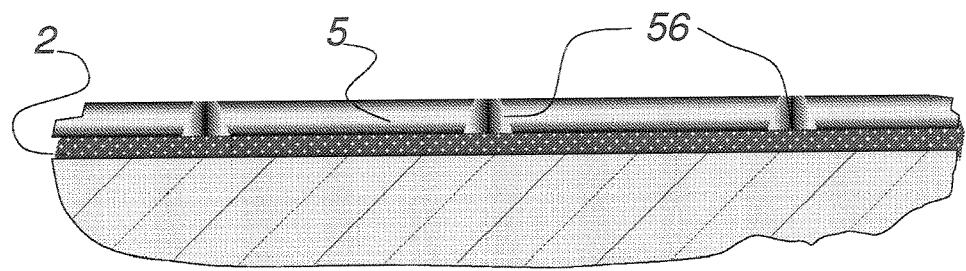
FIG. 5 shows a detail similar to that of FIG. 4 for another embodiment different from that of FIG. 4.

FIGS. 1, 2 and 5 show, in half in the middle of the glazing unit, a communication window 22 below the busbar 4, which communication window is also covered by the colored layer 3 and is therefore concealed from view. It is also possible to provide several communication windows.

Many vehicle windshields are provided, along their upper edge, with a band (not shown here) that is bluish but transparent to light ("band filter"), which in particular reduces dazzling by sunshine. Likewise, such a band may also help to conceal the communication window from view. It may also replace part of the width of the band of the colored layer 3 along the upper edge of the glazing unit, or it may be provided as a complement thereto. Since the general viewing field of the glazing is defined by the inner edge of the colored layer, it may consequently incorporate this bluish band.

As a general rule, the laminated glazing unit 1 is made up from two rigid glass and/or plastic panes 11 and 12 and from an adhesive layer 13 joining the panes at the surface. The busbars 4 and 5 are placed on the adhesive layer 13 (for example a thermoplastic adhesive film made of polyvinyl butyral (PVB), ethylene/vinyl acetate (EVA) or polyurethane (PU)) and are fastened to its surface before the adhesive layer is assembled and bonded to the rigid panes.

The busbars 4 and 5 may be made up from thin narrow strips of metal (copper or aluminum) film, which are usually fixed beforehand to the adhesive film 13 and are applied together with an electrical contact to the coating 2 during assembly of the laminated layers. However, the electrical contact may also be provided by soldering the busbars 4 and 5. During the subsequent autoclave process, a reliable contact is made between the busbars and the coating by the action of heat and pressure.

The busbars 4 and 5 may, as indicated above, be produced, as a variant or as a complement, by printing a conductive paste, which is baked while the glazing units are being bent. This is also appreciably less expensive than positioning parts of metal strips. In all cases, the printed busbars have, during continuous manufacture, a higher ohmic resistance than that of the strips of metal film. The choice, between busbars made of metal film and busbars in screen-printed band form, therefore depends only on the type of glazing and possibly on the overall resistance of the multilayer heating system.

Compared with the coating 2, the busbars are always of negligible ohmic resistance and do not heat up appreciably during operation of the heating means.

Applying a voltage between the two busbars 4 and 5 in the heating coating generates an electric field and, through the resistive effect, a heating field.

Two (or more) heating fields may be provided, in a manner known per se, in the laminated glazing unit 1, which heating fields are to be supplied separately (for example with a vertical division down the middle of the glazing unit) and must also, of course, be connected to their respective power supply via separate conducting connectors. In this case, a common ground conductor may be used for the two heating fields, in such a way that only the busbar 4 or the busbar 5 has to be divided into two parts, whereas the other busbar is continuous. In the first version, four external connectors are required, whereas in the second only three are required.

The external connectors will not be discussed in detail here, because they have already been described many times in the art.

The outer boundary of the main viewing field A of the windshield, lying on the inside of the general viewing field circumscribed by the edge 30 of the colored layer 3, is indicated schematically by a dotted line L. The line L does not constitute an actual edge or the like in the glazing or in the coating, rather it serves merely to visually illustrate the approximate position of the main viewing field A. The latter is described in Annex 18 of the ECE R43 by means of certain parameters of an arbitrary vehicle environment. In this field, no perceptible degradation of vision having a size of greater than 30 microns is permitted. In the secondary viewing field B, around the outside of the main viewing field A, slight limitations in vision, due to additions, etc., are permitted.

According to the invention, when an electrical supply voltage is applied between the busbars 4 and 5, a current flows, forming a heating field in the coating, this heating field including a semiresistive region 6 in direct contact with the upper busbar 4.

Thanks to the present invention, the heating current flows between the busbars via the coating 2 in a heating field that has a region of lower resistivity and then a region having a higher resistivity.

However, in a preferred version of the invention, the heating current flows between the busbars via the coating 2 in a heating field that has a region of lower resistivity and then a region of higher resistivity and then once again a region of lower resistivity.

Figure 6:
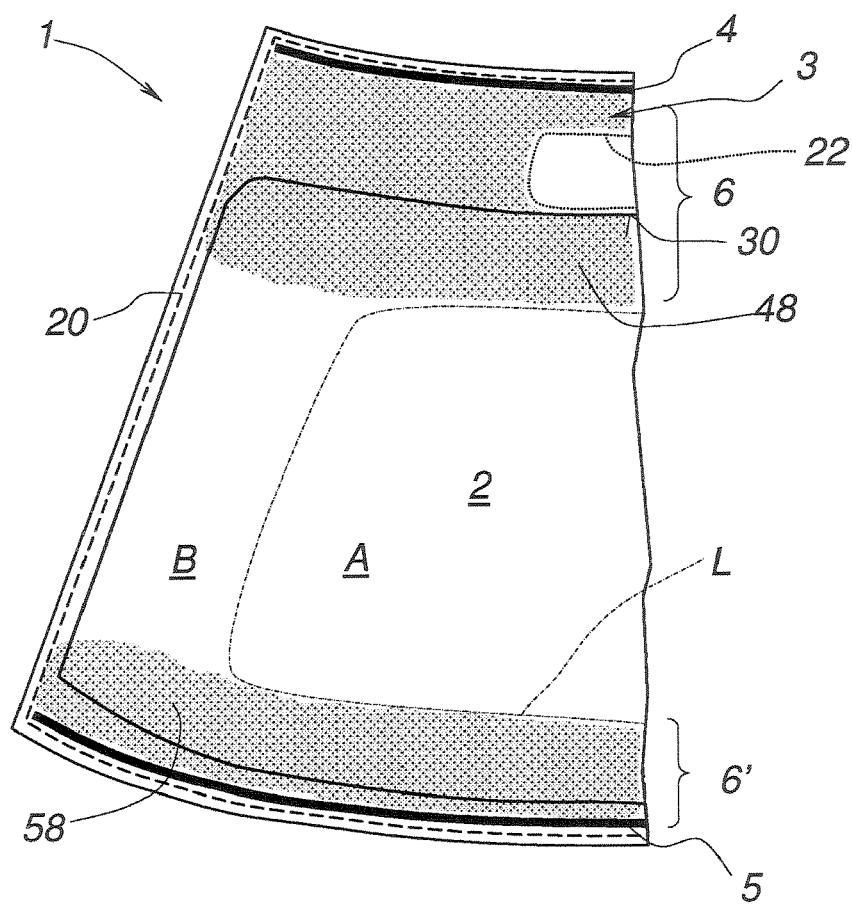
FIG. 6 illustrates another embodiment of a transparent glazing unit with a resistive heating coating, in which the heating coating includes at least one semiresistive region.

As illustrated in FIGS. 1 and 6 in particular, an upper semiresistive region 6 thus extends downward beyond the area covered by the colored layer 3 in the general viewing field of the glazing toward the main viewing field A and a lower semiresistive region 6' extends upward beyond the area covered by the colored layer 3 in the general viewing field of the glazing toward the main viewing field A.

In a first version of the invention, illustrated in FIGS. 1 to 5, starting from the upper busbar 4, a semiresistive region 6 formed by a set of lines extends beneath the colored layer 3, then, in the general viewing field of the laminated glazing unit 1, from the edge region covered by the colored layer 3, into the secondary viewing field B.

These lines terminate blindly in the secondary viewing field B, more or less near the boundary of the main viewing field A. The length of the lines thus produced depends directly on the conductivity of the coating chosen.

These lines represent conducting strands 46, which are electrically connected to the busbar 4 and to the coating 2 and have a low ohmic resistance compared with the latter. A number of these lines also straddle the communication window 22 in such a way as to guarantee that the coating 2 on either side of the communication window, seen from the busbar 4, is supplied directly with power. From the visual standpoint, these lines that straddle the communication window 22 are masked by the colored layer 3. Another form of masking may, as already indicated, be optionally provided by a band of bluish color (band filter), but not shown here.

Conducting strands 56, similar to the conducting strands 46, also extend into the viewing field B of the laminated glazing unit 1 from the lower busbar 5.

In each case, the combination of the conducting strands, 46 or 56 respectively, forms with the coating 2 a semiresistive region according to the invention.

It is unnecessary to provide such conducting strands 46 and 56 for both busbars, 4 and 5 respectively. However, if conducting strands are provided on both sides of the main viewing field A, they in no case extend in such a way that conducting strands of opposite polarity overlap in a projection perpendicular to their overall directions. Thus, the central part of the general viewing field and of the heating field, and in particular the main viewing field A, remains undisturbed.

Whereas in conventional glazing units with layer heating without a semiresistive region the heating current has to flow only via the coating over the entire distance between the busbars, this distance may be reduced to values of between 25% and 80% by the semiresistive region(s) according to the invention and in particular by the conducting strands according to the present invention, depending on the extent of the viewing field A, some of the current spanning the remaining distance in the semiresistive region(s) and in particular in the conducting strands.

In FIGS. 1 and 2, the strands 46 and 56 are placed uniformly apart and are all produced with the same length.

The inner end of the conducting strands is substantially at the same potential as the busbars to which they are connected.

In the general viewing field of the glazing unit, the current flows approximately perpendicular to the busbars 4 and 5 and parallel to the longitudinal general direction of the conducting strands 46, 56.

Thus, the current flows in the general viewing field in a direction approximately parallel to the longitudinal direction of the conducting strands.

As previously, a flow of current, even though small, remains over the entire surface of the coating, because the busbars are not separated from the coating in the parts located between the conducting strands. However, this current flow does not result in the formation of hot spots along the edges of the communication window 22.

To meet the abovementioned objectives of the present invention, the conducting strands, 46 and 56 respectively, must also be in intimate galvanic contact with the coating, in addition to their good conductivity (so as thereby to form, as mentioned above, a semiresistive region). Certainly, in principle it is conceivable to produce them in the form of wire portions. However, they are preferably printed, before the coating is deposited, on that surface of the glazing unit that subsequently will have to bear the coating. Certainly it is also possible to print them on the finished coating, but this runs the risk of damaging the multilayer coating, which is mechanically weak.

Preferably, the conducting strands are printed using a very conductive screen-printing paste containing at least 80%, and preferably more than 85%, silver.

These conducting strands preferably have a dark color seen via an outer face of the glazing, so as to be not easily perceptible to the viewer's eyes when he is looking from the outside into the vehicle and, also preferably, have a light color, seen via an inner face of the glazing, so as to be not easily perceptible to the eyes of the viewer when he is looking out from inside the vehicle.

If printed busbars 4 and 5 are used, they may then be produced in a single operation at the same time as the conducting strands 46/56 and using the same screen-printing paste. No separate operation is then needed to bring the conducting strands into electrical contact with the busbars.

However, if busbars in the form of strips of metal film are used, these then have to be connected with a low ohmic resistance to the coating and to the conducting strands. The strips of film, which are preferably tinned, are therefore soldered to the conducting strands in a manner known per se. In principle, the screen-printing pastes with a high metal content that are used here are easily soldered to the tinned metal strips.

The lengths, separations and number of the conducting strands 46 and 56 and the dimensions of the busbars can only be shown here schematically. However, their relative dimensions may be seen—whereas the busbars 4 and 5 are produced in the form of a usual band with a width of a few millimeters, the conducting strands 46 and 56 are as close together and as invisible as possible, and however appreciably longer than the widths of the busbars.

The individual configuration in a specific laminated glazing unit may certainly be broadly predetermined by simulation. However, it will depend again very greatly on the respective magnitude of the dimensions of the specific glazing, on the type of busbars and on the actual electrical properties of the coating. It may for example also be sufficient to add conducting strands only to one of the busbars. For a relatively short distance between the two busbars 4 and 5, the conducting strands themselves may also be shortened.

In the case of straight lines for a vehicle glazing unit, these lines are not parallel but converge toward the busbar to which they are attached, preferably in such a way that a longitudinal symmetry (along the longitudinal axis of the vehicle) may be observed in the glazing.

It has been determined, for one specific type of glazing unit, that spacing of 25 mm between the various conducting strands can be used. However, the surface heating power levels available in the semiresistive regions can if necessary be adjusted, by varying the spacing, for a given resistance of the conducting strands. Furthermore, to simplify matters, only straight conducting strands have been shown here, but this does not exclude the possibility in practice of producing them in curved and/or corrugated forms, and/or in the form of open or closed loops and/or in portions of arcs and/or in meanders, which could be less visible.

FIG. 2 shows an alternative embodiment in which the coating 2 is divided by separating lines 24 in the general viewing field. The separating lines 24 may pass entirely through the coating down to the surface of the substrate, or else they may penetrate only as far as the conducting partial layer close to the substrate. They have to divide the coating, which by nature is continuous, into current paths. Various techniques exist for producing such separating lines, among which laser cutting is currently the most common, because it is the most economic regarding the result. In particular, the separating lines that can be produced are thus extremely narrow and only perceptible to the naked eye with difficulty.

If FIG. 2 is taken as representing the view seen by the driver of a left-hand drive vehicle, he will usually have to look through the surface part in which the separating lines 24 are the closest together. The purpose of these lines is to collect the current flow through the coating 2 in the main viewing field A precisely in this region, and thus provide the highest heating power in this main viewing region when his vision is obstructed by snow, ice or water droplets and to provide clear vision as quickly and as effectively as possible.

Here too, the arrangement of the separating lines 24 has been indicated only schematically and only few conclusions may be drawn as to actual configurations. It is also not always judicious to always trace continuous separating lines, rather it is possible to produce some or all of them as segmented separating lines, so to speak dotted lines, or to provide, instead of the longer separating lines, a few short portions in order to deflect the current in certain predetermined paths. However, this is already also known from document DE 36 44 297 A1 mentioned above.

However, here again, it is obvious that the heating current in the general viewing field flows approximately in an overall direction perpendicular to the busbars and parallel to the longitudinal axes of the conducting strands 46/56.

Figure 3:
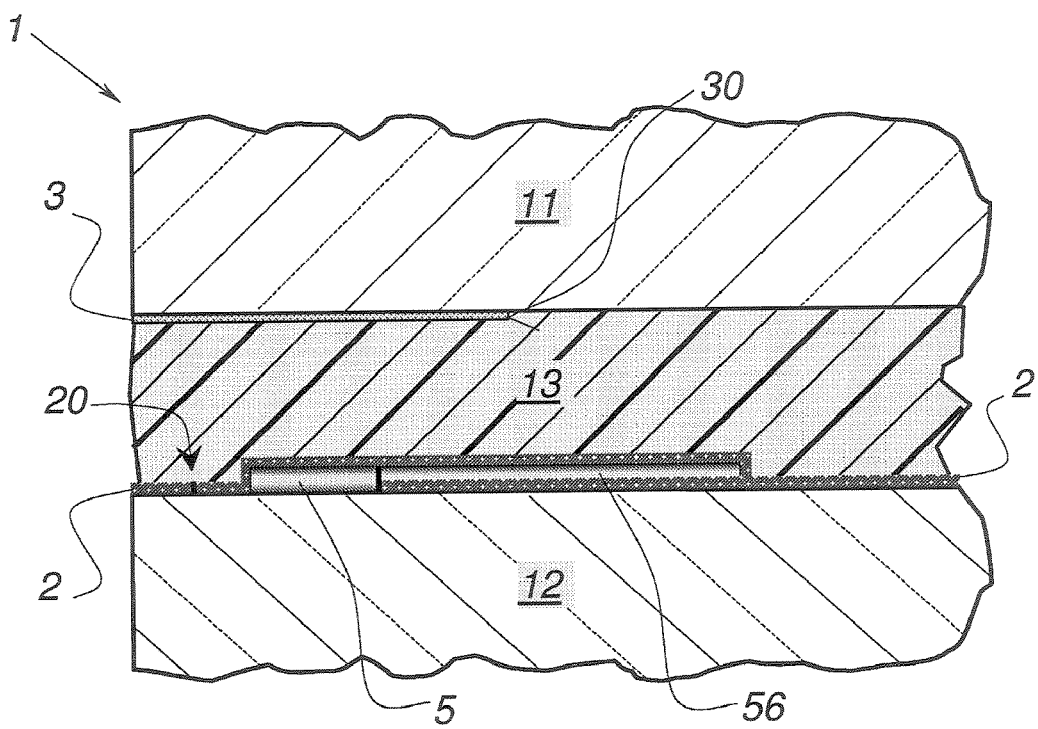
FIG. 3 shows a partial cross section through a glazing unit according to the invention along the line III-III in FIG. 1.

FIG. 3 shows a sectional view through the edge of the glazing unit 1 along the line III-III of FIG. 1. Two rigid individual panes 11, 12 (made of glass or plastic) and an electrically insulating adhesive layer 13, which is optically transparent and joining said panes together by bonding in the usual manner, may be seen. This adhesive layer 13 is subdivided horizontally by dot-dash lines in order to indicate that it is in fact considerably thicker than the transparent coating 2 deposited on the lower pane 12. This coating is shaded gray here for the sake of visibility. The adhesive layer may be formed in the usual manner by a PVB film having a thickness of about 0.76 mm.

The numerical references in FIGS. 1 and 2 have been preserved. The coating 2, the outer edge region of which is separated by the separating lines 20, is, as may be seen, located on the pane 12 above the busbar 5 and the conducting strands 56 connected to the latter, which strands have been deposited here, before deposition of the coating 2, in the form of screen-printed structures. The opaque colored layer 3 here is printed on that face of the pane 11 located on the inside of the composite glazing unit and overlaps, in vertical projection (the viewing direction) the separating line 20, the busbar 5 and the conducting strands in their part which is connected directly to the busbar. However, the conducting strands also extend beyond the edge 30 of the opaque colored layer 3 as far as the general viewing field of the glazing unit 1.

The opaque colored layer 3 could also, unlike in the representation, be located on the outer faces (not visible here) of one of the panes 11 or 12, or also on the same surface as the coating 2 and the busbars 4 and 5.

Figure 4:
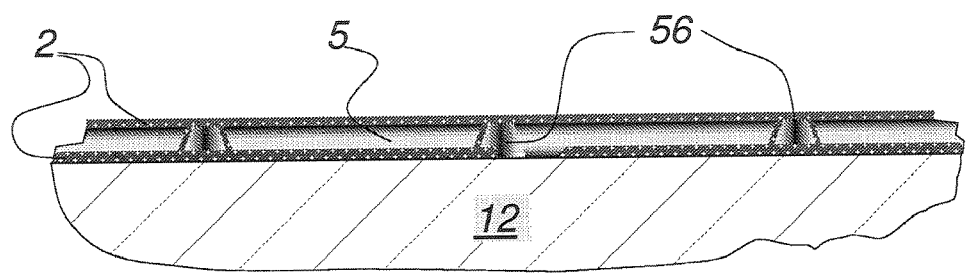
FIG. 4 shows a detail taken from FIG. 3.

FIG. 4 illustrates the arrangement of the conducting strands through another section, the viewing direction of which starts from the right in FIG. 3 in the plane of the surface of the pane 12. The view is therefore toward the front faces of the conducting strands 56, in the background of which the busbar 5 extends transversely to the viewing direction.

To improve viewing, in the region of the central conducting strand in FIG. 4, the coating 2 on the surface of the pane 12 has been partly removed. More precisely, it may be seen that both the busbar and the conducting strand lie beneath the coating 2 on the surface of the pane 12.

In another embodiment, illustrated in FIG. 5, with the busbar manufactured from strips of metal films, these would be applied to the coating 2 and assembled to the latter as continuously as possible and with as low a resistance as possible by soldered assemblies or, where necessary, also by conductive adhesives (this also being known as an alternative). The soldered assemblies must of course be provided in particular at the conducting strands.

In a second version of the invention, illustrated in FIG. 6, starting from the upper busbar 4, a semiresistive region 6 formed by a particular region of the heating coating 2 and illustrated by crossed dotted lines, extends beneath the colored layer 3 and then into the general viewing field of the laminated glazing unit 1 from the edge region covered by the colored layer 3 toward the inside of the secondary viewing field B. In this semiresistive region 6, the resistance of the heating coating 2 is less than the resistance of the heating coating outside any semiresistive region.

In this semiresistive region 6, the resistance of the heating coating 2 is two times, five times or even ten times less, or even less, than the resistance of the resistive coating outside any semiresistive region.

Starting from the lower busbar 5, a semiresistive region 6' formed by one particular region 58 of the heating coating 2, similar to the other particular region 48 that forms the semiresistive region 6 and illustrated also by crossed dotted lines, extends into the viewing field B of the laminated glazing unit 1.

It is not necessary to provide such semiresistive regions of the coating for both busbars, 4 and 5 respectively. However, if semiresistive regions of the coating are provided on both sides of the main viewing field A, they do not extend into the central part of the general viewing field and of the heating field, and in particular the main viewing field A remains undisturbed.

This second version may be obtained in industrial practice by depositing additional layers in semiresistive regions, either during deposition of the heating coating itself, by transverse variations in the thicknesses of the layers on the large plates coated continuously with the heating coating, or after the substrates coated with the heating coating have been cut out, by an additional local deposition on these substrates.

Figure 7:
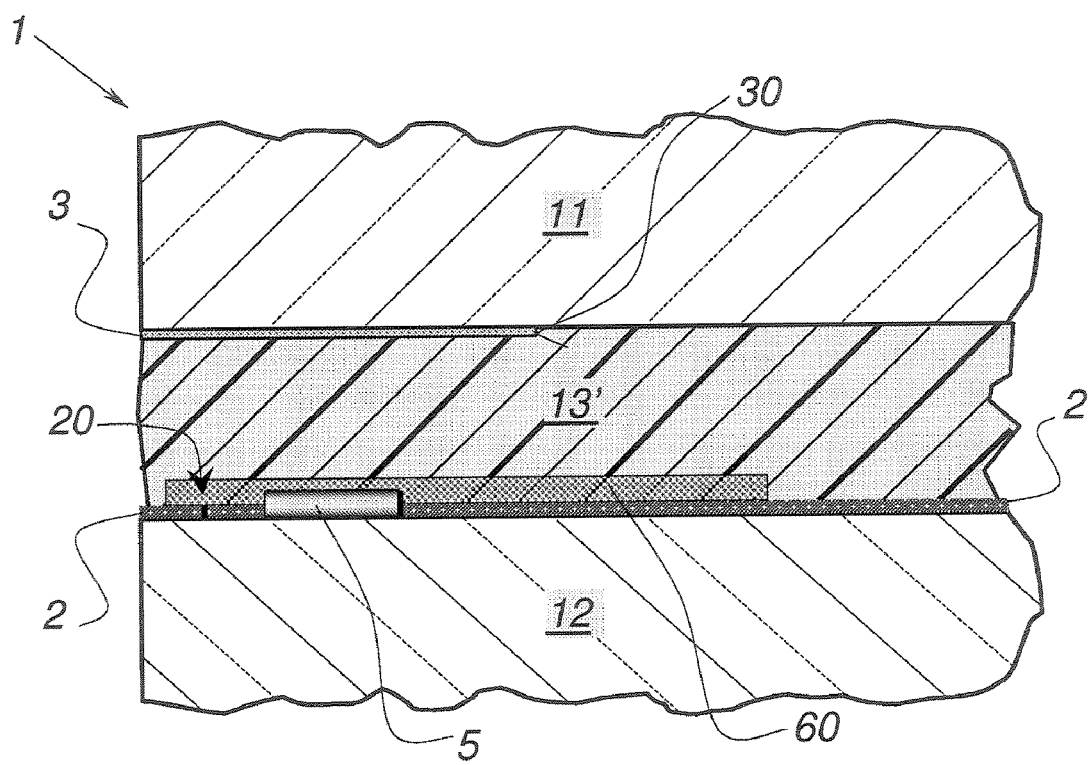
FIG. 7 illustrates another embodiment of a transparent glazing unit with a resistive heating coating, in which the adhesive layer has a semiresistive region, the figure being a partial cross section, similar to that illustrated in FIG. 3, through another glazing unit.

In a third version of the invention, illustrated in FIG. 7, the glazing is a composite glazing unit that includes at least one adhesive layer 13' in electrical contact with the heating coating 2. This adhesive layer 13' includes at least one semiresistive region illustrated here by a band 60 of semiresistive plastic. This band is included in that face of the adhesive layer that will be in contact with the heating coating 2 during manufacture of the layer so that, during manufacture of the glazing unit, the plastic band 60 is in contact with the busbar 5.

This third version is illustrated in the lower part of the glazing unit, but it may of course also, or instead, be used in the upper part of the glazing unit.

It is also possible for the plastic band or portion to be produced over the entire thickness of the adhesive layer 13' or else for it to be formed by a strip of plastic that incorporates a conducting grid on its surface in contact with the heating coating.

It is also conceivable to combine the plastic band 60, which is possibly conducting, with the coating 2 as a semiresistive region, since in each case that part of the coating 2 which is covered by said band 60 conducts at least part of the heating current.

To produce such a semiresistive or quite conductive plastic band 60, it is for example possible to dope a "matrix" material of the thermoplastic film used (PVB, EVA or polyurethane) with conducting particles, especially metal particles, of such a density that the region or volume in question is at least semiresistive or even conductive. Such doping is possible without excessively impeding the light transmission.

The present invention has been described in the foregoing by way of example. Of course, a person skilled in the art is capable of producing various alternative embodiments of the invention without thereby departing from the scope of the patent as defined by the claims.

A person skilled in the art is in particular capable of combining various versions and embodiments of the invention described above.

The invention claimed is:
1. A transparent glazing unit, comprising:
a first busbar positioned at a top of the glazing unit;
a second busbar positioned at a bottom of the glazing unit;
a resistive heating coating that extends over a part of the glazing unit from the first busbar to the second busbar, and that is electrically connected to the first busbar and the second busbar such that, when an electrical supply voltage is applied between the first busbar and the sec- ond busbar, a current flows, which heats a heating field in the resistive heating coating; and a plurality of conducting strands each extending from, and in direct contact with, the first busbar or the second busbar towards an other of the first busbar or the second busbar, to form at least one semiresistive region, wherein the plurality of conducting strands are in direct contact with the resistive heating coating.

2. The glazing unit as claimed in claim 1, wherein a main viewing field does not include a semiresistive region.

3. The glazing unit as claimed in claim 2, wherein the main viewing field lies between at least two semiresistive regions.

4. The glazing unit as claimed in claim 1, wherein at least one part of a peripheral edge of the glazing unit is concealed by an opaque colored layer and the at least one semiresistive region extends into a secondary viewing field of the glazing, beyond an area covered by the colored layer.

5. The glazing unit as claimed in claim 1, wherein resistance of the resistive heating coating in the semiresistive region is at least less than resistance of the resistive heating coating outside any semiresistive region.

6. The glazing unit as claimed in claim 5, wherein the resistance of the resistive heating coating in the semiresistive region is at least two times less than the resistance of the resistive heating coating outside the semiresistive region.

7. The glazing unit as claimed in claim 1, wherein the glazing unit is a composite glazing unit that includes at least one adhesive layer in electrical contact with the resistive heating coating, the adhesive layer including the at least one semiresistive region.

8. A transparent glazing unit, comprising:
a first busbar positioned at a top of the glazing unit;
a second busbar positioned at a bottom of the glazing unit;
a resistive heating coating that extends over a part of the glazing unit from the first busbar to the second busbar, and that is electrically connected to the first busbar and the second busbar such that, when an electrical supply voltage is applied between the first busbar and the second busbar, a current flows, which heats a heating field in the resistive heating coating; and
a plastic band in direct contact with the resistive heating coating and at least one of the first busbar and the second busbar to form a semiresistive region in an adhesive layer of the glazing unit, wherein the plastic band is doped with conducting particles.

9. The glazing unit as claimed in claim 1, wherein the conducting strands are conducting printed lines and/or conducting wires.

10. The glazing unit as claimed in claim 9, wherein a length of each of the strands is greater than a width of the first busbar or the second busbar that the strands extend from.

11. The glazing unit as claimed in claim 9, wherein the strands have a width and/or a thickness of 0.5 mm or less, measured in projection on the surface of the glazing unit.

12. The glazing unit as claimed in claim 9, wherein the strands are conducting printed lines that are printed on the resistive heating coating.

13. The glazing unit as claimed in claim 9, wherein the strands are the conducting wires that are electrically connected to the resistive heating coating and at least to the semiresistive region by soldering at least at discrete contact points.

14. The glazing unit as claimed in claim 9, wherein the current flows in a main viewing field in a direction approximately parallel to a longitudinal direction of the conducting strands.

15. The glazing unit as claimed in claim 9, wherein the strands are dark in color when viewed from an external face of the glazing unit.

16. The glazing unit as claimed in claim 9, wherein the strands are light in color when viewed from an internal face of the glazing unit.

17. The glazing unit as claimed in claim 9, wherein the strands are placed uniformly apart.

18. The glazing unit as claimed in claim 9, wherein the strands are all produced with a same length.

19. The glazing unit as claimed in claim 9, wherein the strands are produced in a form of straight lines, open or closed loops, portions of arcs, and/or meanders.

20. The glazing unit as claimed in claim 1, wherein the resistive heating coating is divided by separating lines in a main viewing field, which lines divide up the resistive heating coating into current paths.

21. The glazing unit as claimed in claim 20, wherein the separating lines collect current in the main viewing field.

22. The glazing unit as claimed in claim 1, wherein the busbars are produced by printing and/or from metal strips.

23. The glazing unit as claimed in claim 22, wherein the printed busbars are printed on the resistive heating coating.

24. The glazing unit as claimed in claim 22, wherein the busbars produced from the metal strips are electrically connected to the resistive heating coating and to the semiresistive region by soldering at least at discrete contact points.

25. The glazing unit as claimed in claim 1, wherein the semiresistive region is placed only over part of a longitudinal extent of at least one of the first busbar and the second busbar.

26. The glazing unit as claimed in claim 1, wherein the glazing unit is a vehicle windshield, and the semiresistive region extends at most as far as a boundary of a normalized viewing field of the windshield.

27. The glazing unit as claimed in claim 1, wherein a bluish band extends at least along an upper edge of the glazing unit and at least partly conceals the semiresistive region positioned at the upper edge.

28. The glazing unit as claimed in claim 1, wherein
the at least one semiresistive region of the glazing unit includes a first semiresistive region and a second semiresistive region,
a first portion of the plurality of conducting strands extends from the first busbar towards the second busbar to form the first semiresistive region,
a second portion of the plurality of conducting strands extends from the second busbar towards the first busbar to form the second semiresistive region, and
a main viewing field of the glazing unit is positioned between the first semiresistive region and the second semiresistive region.

* * * * *